US007870141B2

(12) United States Patent
Judge et al.

(10) Patent No.: US 7,870,141 B2
(45) Date of Patent: Jan. 11, 2011

(54) METHOD AND SYSTEM FOR FINDING A FOCUS OF A DOCUMENT

(75) Inventors: John Judge, Palatine Square (IE);
Akihiro Nakayama, Kawasaki (JP);
Mikhail Sogrin, Royal Canal Park (IE);
Alexander Troussov, Donabate (IE)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 12/037,443

(22) Filed: Feb. 26, 2008

(65) Prior Publication Data

US 2008/0263038 A1    Oct. 23, 2008

(30) Foreign Application Priority Data

Apr. 17, 2007   (EP)   ................................ 07106352

(51) Int. Cl.
*G06F 17/30*   (2006.01)
(52) U.S. Cl. ..................................... 707/750
(58) Field of Classification Search ................. 707/737, 707/750, 999.006
See application file for complete search history.

(56) References Cited

U.S. PATENT DOCUMENTS

| | | | |
|---|---|---|---|
| 6,678,692 B1 * | 1/2004 | Hyatt | 707/758 |
| 2007/0233864 A1 * | 10/2007 | Xie et al. | 709/226 |
| 2008/0005094 A1 * | 1/2008 | Cunnane et al. | 707/4 |
| 2008/0033947 A1 | 2/2008 | Bermingham et al. | |

OTHER PUBLICATIONS

Dekang Lin, Using Dyntactic Dependency as Local Context to Resolve Word Sense Ambiguity, 1997, Association of Comoputational Linguistics, p. 64-71.*
Gale et al., "A Method for Disambiguating Word Senses in a Large Corpus", pp. 1-30, 1992.
Amitay et al., "Web-a-Where: Geotagging Web Content", pp. 273-280, SIGIR '04, Jul. 25-29, 2004, Sheffield, South Yorkshire, UK, Copyright 2004.
PCT, "Notification of Transmittal of the International Search Report and the Written Opinion of the International Searching Authority, or the Declaration", International Application No. PCT/EP2008/053927, Date of Mailing Oct. 31, 2008.
Kinsella et al., "Navigating and Annotating Semantically-Enabled Networks of People and Associated Objects", ASNA 2007, Sep. 13-15, 2007, XP002500568.
Crestani et al., "Searching the Web by Constrained Spreading Activation", Information Processing and Management, Elsevier, Barking, GB, vol. 36, No. 4, Jul. 1, 2000, pp. 585-605, XP004195725.

* cited by examiner

*Primary Examiner*—John E Breene
*Assistant Examiner*—Thu-Nguyet Le
(74) *Attorney, Agent, or Firm*—Daniel McLoughin; Hoffman Warnick LLC

(57) ABSTRACT

Method and apparatus for finding the focus of a document. A semantic network includes a plurality of nodes, each representing a concept, and links, connecting the nodes, representing relations between the concepts is used. The method including: providing a list of terms in an input document which match concepts represented by the semantic network, and a frequency value for each matched term indicating the number of times the term appears in the document; mapping each matched term to a referent node or to a plurality of possible referent nodes in the semantic network, and assigning weights to nodes.

20 Claims, 5 Drawing Sheets

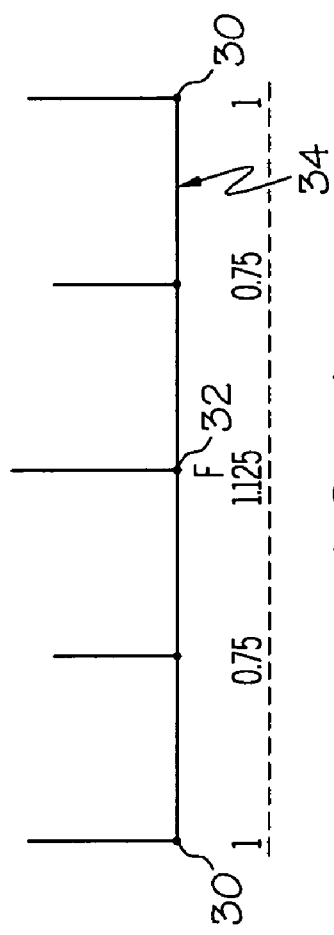
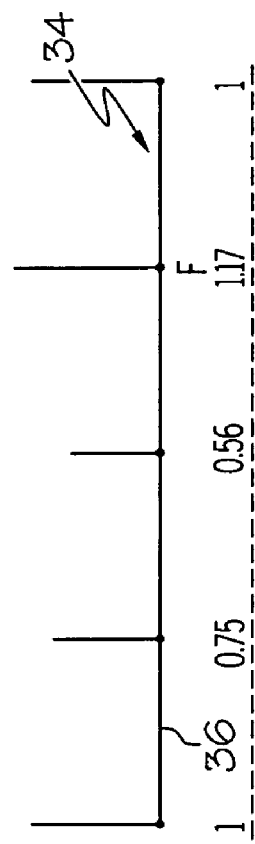

US 7,870,141 B2

METHOD AND SYSTEM FOR FINDING A FOCUS OF A DOCUMENT

FIELD OF THE INVENTION

The present invention relates to the field of natural language systems. In particular, the invention relates to an improved method and system for determining foci of a document for use in term disambiguation.

BACKGROUND OF THE INVENTION

Using knowledge organized in structures is useful for text analysis. In computer applications this knowledge is often modeled by graphs—networks of nodes (also called vertices), which represent concepts, interconnected by links (sometimes called arcs or edges), which represent relationships between the concepts. Such concept graphs, sometimes called ontologies, already exist for knowledge in many domains, for example: geography, medical, social networks (e.g., people networks in corporations), as well as lexico-semantic resources.

Key terms in a document can usually be recognized by some form of Natural Language Processing, for example. However, many words or expressions are ambiguous, with a single word or term having a number of different possible meanings. For example, the term 'Dublin' may refer to one of a number of possible locations throughout the world; or a mention of the word 'Baker' may refer to the word's common English meaning, but may also be used as a surname. Graph mining techniques are often used in order to try to disambiguate such terms.

Typically, such techniques map mentions of terms from a clause, sentence, paragraph or the whole text of a document to one or more concepts represented by a concept network. Then a graph clustering algorithm is used to establish the central concept, also known as the focus, of the text. The focus is then used to disambiguate any ambiguous term references in the text. An example of geographical disambiguation may help to explain. Suppose a text is found to mention of "Dublin," "London," "Athens," and "Greece". It is unclear whether "Dublin" refers to Dublin/Ireland/Europe or to Dublin/CA/USA. Likewise, "London" and "Athens" are also ambiguous (London/OH/USA or London/UK/Europe and Athens/GA/USA or Athens/Greece/Europe). If an analysis of clusters in the graph based on the concepts mentioned in the text shows that the strongest cluster is centered around Europe, this is deemed to be the focus concept. If there is only a single geographical focus in the text (as in this example) all ambiguous geographical terms are disambiguated relative to this focus as they are most likely related to it. In the case of this example, the result is that Dublin/Ireland/Europe, London/UK/Europe and Athens/Greece/Europe are chosen (disambiguated) as the concepts to which the geographically ambiguous terms "Dublin," "London," and "Athens" refer.

Whilst the example of geographical disambiguation is used throughout this document to illustrate an application of graph mining techniques, this should not be construed as limiting the scope of this disclosure. Such techniques may also be used for other types of term disambiguation, including word sense disambiguation, as well as for other applications, such as semantic tagging, and social network analysis.

To find document keywords and provide term disambiguation, many different methods have been suggested. Many use graph clustering algorithms in which nodes are allocated to clusters according to some similarity metric. These usually require a pair-wise comparison of nodes in order to determine a conceptual similarity between nodes. The time and processing complexity of such algorithms can be extremely high, sometimes being proportional to the square of the number of nodes in the concept network. This presents a scalability problem which prohibits use of these algorithms in many important industrial applications where the number of nodes on the concept network may be large and thus the calculation of the central concepts of even a single document may become infeasible within a reasonable time.

In some concept networks information about nodes and/or about the relationship between two concepts may be included by way of attributes of the node and/or the link between the two nodes representing those concepts. Graph mining techniques have been developed which use such additional information to favor certain properties. For instance, in a geographical disambiguation, geographical locations with larger population could be given a greater preference. This would favor London/UK/Europe (population 7.5 million) over London/OH/USA (population 9000). Similarly different types of links between nodes can be favored or disregarded entirely depending on the application.

Such techniques are described in "Web-a-Where: Geotagging Web Content" Proceedings SIGIR'04, Sheffield, UK, and the applicant's co-pending U.S. patent application Ser. No. 11/611,871. These techniques overcome some of the time complexity problems referred to earlier and allow the use of some additional information attached to nodes. However, these papers use hierarchical clustering algorithms which rely on a tree-structured topology in order to simplify the required processing.

Whilst some types of knowledge, such as graphical locations or organizational structure, lend themselves to be easily organized into a hierarchical tree of parent and child nodes, where each city/employee has a parent country/manager, which has a parent continent/manager, and so on, all the way up to a common root element, many ontologies exist which cannot be represented by such a hierarchy. For example, an organizational structure, which in addition to identifying the management structure, also links employees according to other relationships such as membership of certain departments, locations etc. Another example is a semantic network which represents the semantic relations between a huge number of concepts or entities. In addition to the subset/superset relation between entities, which might be expressed as a parent/child relation in a tree-like structure, there are many other semantic relations, for example the 'part of' relation, which indicates that entity A is a part of entity B. This means that entities may have more than one 'parent'. As well as these relations, ontologies often include additional types of relation that further refine the semantics they model, and which may be domain-specific.

When moving from structured hierarchies to generic graphs complications, such as loops (where an outgoing link refers to a node which refers back to the original node), are introduced. Such looping behavior is common in semantic ontologies and social networks, and cannot be handled by the previous art.

Thus, there is a need in the art to provide a method and system which addresses these and other problems.

SUMMARY OF THE INVENTION

A first aspect of the present invention provides a method for finding a focus of a document using a semantic network comprising a plurality of nodes, each node representing a concept, and links, connecting the nodes, each link representing relations between the concepts. The method comprises:

providing a list of terms found in an input document which match concepts represented by the semantic network, and a frequency value for each matched term indicating a number of times the term appears in the document; mapping each matched term to a referent node or to a plurality of possible referent nodes in the semantic network, and assigning weights to nodes. Assigning weights to nodes comprises carrying out the following for each matched term. Selecting one of the referent nodes as a start node; assigning the start node an initial weight depending on the frequency value of the term; carrying out a depth-first traversal of the semantic network, and repeating these steps for a next referent node for the term. The depth-first traversal starts from the start node, and at each node in the traversal calculates a weight of the current node based on the weight of the previous node in the traversal and a stepping factor, with the search backtracking to previous nodes when the weight of a current node is found to be less than a predefined weight threshold. This process is then repeated for the next matched term. Then, the weights for each node from all traversals are added together and a focus of the input document is determined by identifying the node having the heaviest weight.

A second aspect of the present invention provides an apparatus for finding a focus of a document using a semantic network comprising a plurality of nodes, each node representing a concept, and links, connecting the nodes, each link representing relations between the concepts. The apparatus comprises; a scanning component for generating a list of terms found in an input document which match concepts represented by the semantic network, and a frequency value for each matched term indicating a number of times the term appears in the input document, and for mapping each matched term to a referent node or to a plurality of possible referent nodes in the semantic network; and a determining component for assigning weights to nodes and determining a focus of the input document based on the assigned weights of the nodes. Assigning weights to nodes comprises carrying out the following for each matched term. Selecting one of the referent nodes as a start node; assigning the start node an initial weight depending on the frequency value of the term; carrying out a depth-first traversal of the semantic network, and then repeating this process for a next referent node for the term. The depth-first traversal starts from the start node, and at each node in the traversal calculates a weight of the current node based on the weight of the previous node in the traversal and a stepping factor, with the search backtracking to previous nodes when the weight of a current node is found to be less than a predefined weight threshold. This process is then repeated for the next matched term. Then, the weights for each node from all traversals are added together.

Viewed from a third aspect the present invention provides a computer program product loadable into the internal memory of a digital computer, comprising software code portions for performing, when said product is run on a computer, the invention as described above.

Viewed from a fourth aspect the present invention provides a data processing system for, identifying the focus of a document, the data processing system comprising, a central processing unit, a memory device and a storage device adapted for carrying out the invention as described above.

The present invention provides a high performance focus determining algorithm which is not dependant on a particular graph topology. Experiments with huge ontologies and wide ambiguity of terms have shown that the method can perform disambiguation in less than 200 milliseconds. Thus, it could even be used to disambiguate terms used in an instant messaging conversation in real time.

The present invention can be applied to any kind of linked graph or tree, and allows for different kinds of links, which can be directed or undirected. It provides a method for identifying the centrality of concepts in an ontology and finding a local focus node in a graph network based on the propagation of weights from each of a set of nodes to neighboring nodes along links in the network/ontology and using properties of the ontology (semantic properties of concepts and types of links) and user specified constraints (greater emphasis on certain links, averaging weight propagated onwards over links, the rate of decay as weight is propagated onwards). The solution is highly customizable, useful for a wide variety of tasks and can be tuned for a user's specific needs.

The method can be used to find a focus node or nodes in an ontology given a set of start nodes which are of interest e.g., search terms, mentions of people in a document, etc. The method propagates weight outward in all directions from a node along all outgoing links to other nodes. The effect on surrounding nodes lessens as it moves farther from the source by a factor which the user can control. Likewise, different types of links can have a greater or lesser effect on the decaying process depending on the user's specifications. Where only a single node is concerned, then it is in the focus, however when multiple nodes are concerned, weight is propagated outward from each node along its links and the focus is deemed to be the area (or areas) which have the greatest weight after propagation.

The method deals with a changing sub-graph, based around a set of start nodes within the full graph, and finds a focus (or foci) relative to those nodes, dependent upon the graph topology and the user's constraints on how propagation around the graph can happen. The focus found is similar to finding a central node or concept for the given sub-graph. However, dependent on the starting nodes, the user's conditions and graph topology multiple foci or no focus may be returned. In this way it does not return a central concept or focus unless one can be found which is close to the starting nodes. Each focus found may then be used to disambiguate terms based on proximity (number of steps) to the focus.

A semantic network is represented as an oriented graph with the nodes and arcs (links). The nodes represent concepts, which are like entries in semantic dictionaries or encyclopedias, they have glosses, i.e., attached information (in case of geography, concepts are geographical locations, glosses might include population or other distinguishing information). The arcs (links) represent relations or associations between the concepts, are typed to represent different relations or associations, and can be directed or undirected. Semantic networks are usually generated from lexico-semantic resources, e.g., MeSH which includes a lexical layer, a mapping resource (to map from the text to concepts), and a network layer; or are built as social networks.

BRIEF DESCRIPTION OF THE DRAWINGS

Embodiments of the present invention will now be described, by way of examples only, with reference to the accompanying drawings.

FIGS. 3a and 3b illustrate a method of propagation of weight around a linear graph by way of analogy with the propagation of light.

DETAILED DESCRIPTION OF THE INVENTION

Figure 1:
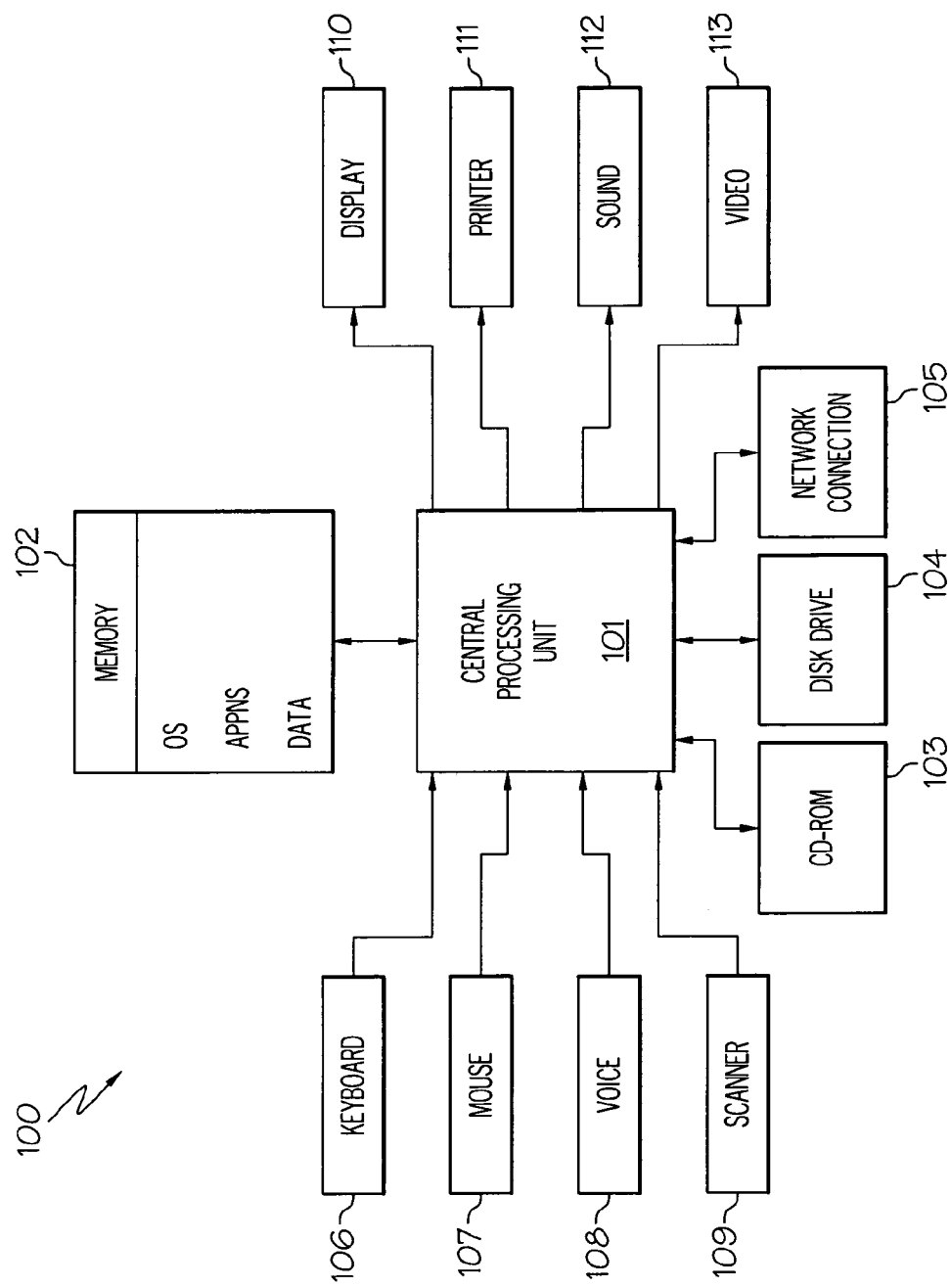
FIG. 1 is a block diagram of a general purpose computer system in which a system in accordance with the present application may be implemented.

Referring to FIG. 1, a general embodiment of a computer system 100 is shown in which the present invention may be implemented. The computer system 100 has a central processing unit 101 with primary storage in the form of memory 102 (e.g., RAM and ROM). The memory 102 stores program information and data acted on or created by the programs. The program information includes the operating system code for the computer system 100 and application code for applications running on the computer system 100. Secondary storage includes optical disk storage 103 and magnetic disk storage 104. Data and program information can also be stored and accessed from the secondary storage.

The computer system 100 includes a network connection 105 for interfacing the computer system 100 to a network such as a local area network (LAN) or the Internet. The computer system 100 may also have other external source communication means such as a fax modem or telephone connection.

The central processing unit 101 includes inputs in the form of, as examples, a keyboard 106, a mouse 107, voice input 108, and a scanner 109 for inputting text, images, graphics or the like. Outputs from the central processing unit 101 may include a display means 110, a printer 111, sound output 112, video output 113, etc.

In a distributed system, a computer system 100 as shown in FIG. 1 may be connected via the network connection 105 to a server on which applications may be run remotely from the central processing unit 101 which is then referred to as a client system.

The method in accordance with an embodiment of the present invention works on the principle of weight propagating outwards from a graph node along its links. By way of explanation of the propagation of weights used in the method, an analogy of light spreading outwards from a light source and getting dimmer as it travels farther can be used. The "light" is propagated outwards from a node in the graph along its various links. If nodes are close enough together in the graph their propagated light can combine at another point "illuminating" it to a greater degree. This is the focus.

FIG. 3a shows how the algorithm finds the focus in a simple linear graph 34 from two start nodes 30 at opposite ends of the graph, each emitting light at an intensity value of '1'. Light is propagated along the graph to neighboring nodes. From each start node, the illumination reaching successive nodes decreases with the distance from that start node. As shown on the graph, the level of light is greatest (1.125) at the central node 32, as it is "illuminated" by both start nodes, so it is chosen as the focus (F).

Different types of links can affect the outcome differently. FIG. 3b shows the same graph 34 but with directed links 36. This figure illustrates how by changing properties of the arcs the focus (F) shifts, in this example to the second node from the right.

Figure 4A:
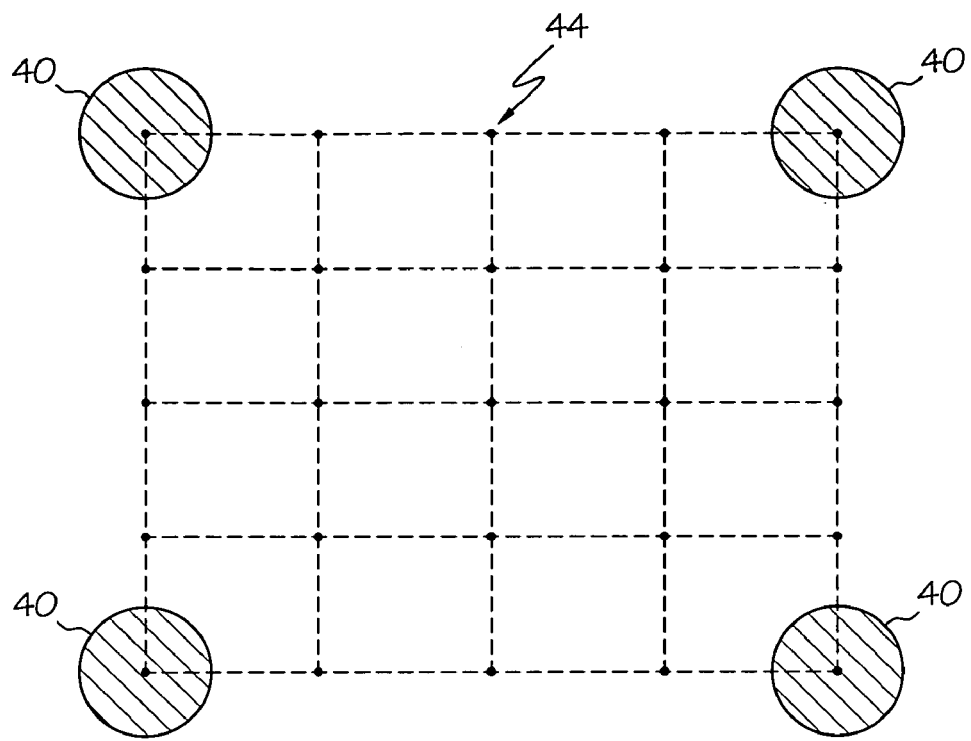
FIGS. 4a and 4b illustrate propagation around a more complex graph using the same analogy as FIGS. 3a and 3b.
Figure 4B:
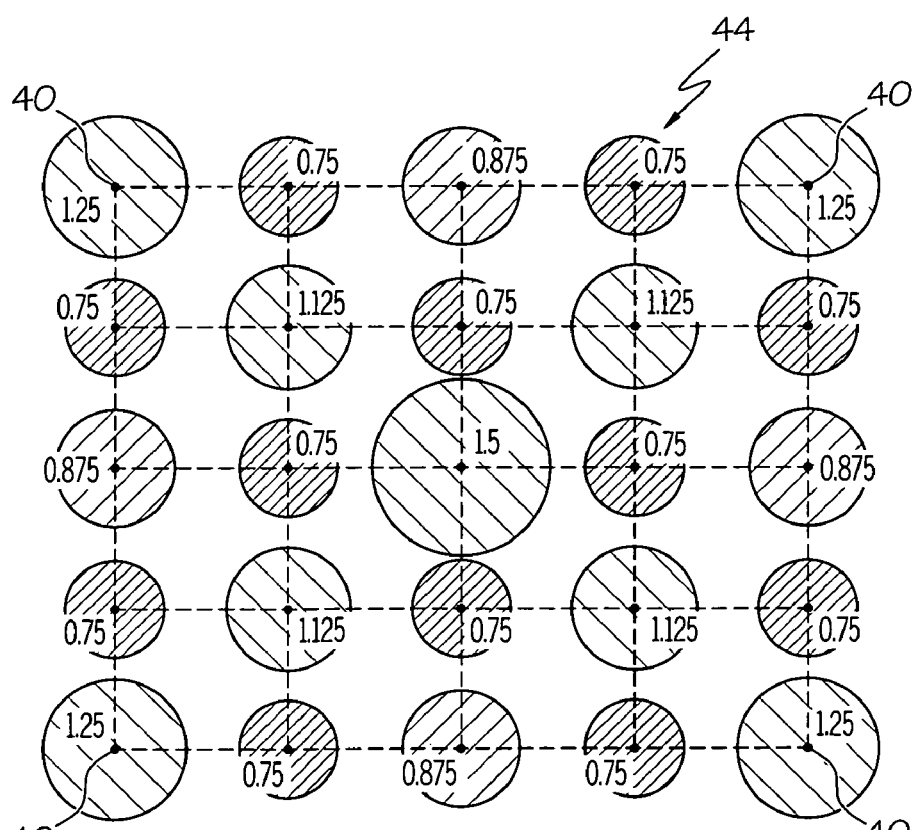

FIG. 4a shows a more complex graph example with undirected arcs and light being emitted from four nodes 40, before the light has been propagated around the graph 44. FIG. 4b shows the same graph after the light from the four source nodes has been propagated around the graph and summed for each node. Note that the amount of light at each of the corner nodes is greater after the light has been propagated around the graph. This is because light from each of the nodes affects the others.

Figure 2:
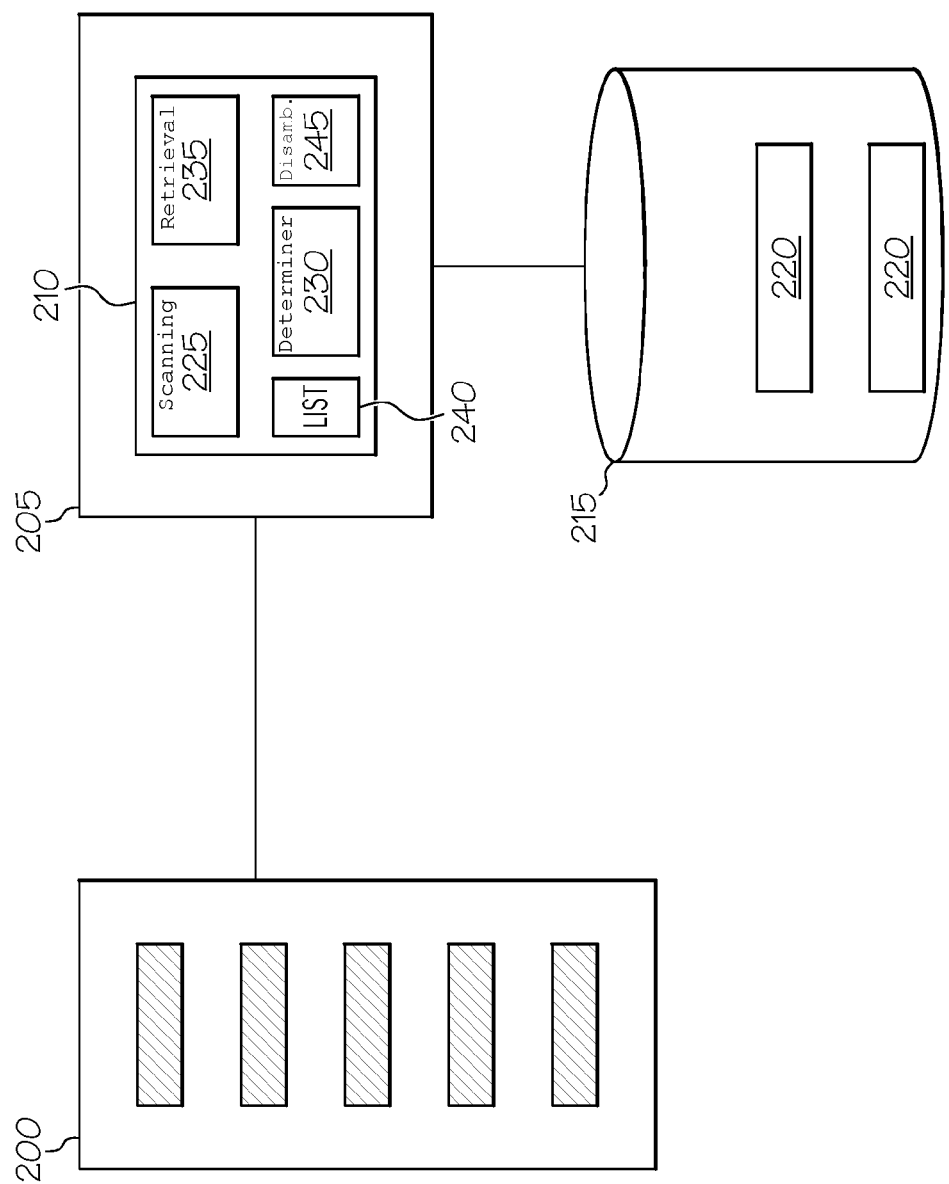
FIG. 2 is a schematic block diagram of a system in accordance with an embodiment of the present invention.

Returning from the light propagation analogy, a focus determining component according to an embodiment of the present invention will now be described. Referring to FIG. 2, a focus determining component 210 is shown interfacing with a text mining application 205 and a data store 215. The focus determining component determines a focus and performs term disambiguation of a text document 200, which may for example be a word processed document, a scanned document, an email message, a Web page, or a published article.

The data store 215 stores one or more semantic networks 220, each representing a different ontological domain, for example geography or management structure, etc.

The focus determining component 210 may be provided as part of a data or text mining application or as part or a natural language processing application, a search engine of an Internet access program, or as part of another form of text indexing and retrieving program. The focus determining component 210 may run on a computer system 100 or from storage means in a computer system 100 and may form part of the hardware of a computer system 100 or may be run remotely via a network connection 105.

The focus determining component 210 comprises a number of components, namely, a scanning component 225, a retrieval component 235 a determiner component 230, and a disambiguation component 245. These components interface and interact with each other in order to determine a focus and to disambiguate terms in the document 200. Each of these components will be explained in turn.

A concept network 220 may be retrieved from the data store 215 by the retrieval component 235 on request of the scanning component 225. An example of such a network is a lexico-semantic network consisting of a structured semantic graph, representing a network of concepts and their relationships, and a mapping from each node in the graph to a lexical expression, each lexical expression existing in a particular lexicon (for example of a particular language) which the concept network is being used to represent.

The structure comprises nodes (representing concepts) and arcs connecting these nodes (representing links or relations between concepts). Each node is associated with a unique concept identifier. This enables a single semantic graph to represent a number of different languages, using mappings to different language dictionaries. Each node has assigned to it one or more lexical expressions which relate to that concept.

Each node also has an associated predefined importance value, given as a real number. Importance is an arbitrary function calculated on the basis of semantic data associated with concepts. For example, in the geographical domain, a capital city would be allocated a high importance value. If no importance information is available, importance of all concepts is considered to be equal.

Each link also has a type. The types of link depend on the particular semantic network, for example there may be the following links: "Managed By"; "Manages"; "GroupName"; "ParentGroup"; "IsPartOf"; "Includes"; "OwnedBy"; "Owns"; "LocatedIn"; "LocationOf", etc. Each link type is associated with a real number which may be used in determining a reduction multiplier, for use in the calculation of the weight of a current node in the depth-first traversal for a step using that link.

The mapping between lexical expressions in the lexicon to nodes in the graph may be ambiguous: a lexical expression may map to several different nodes (referents), for example the word Baker may map to a node representing the surname Baker, as well as to a node representing the bread-making sense of the word; and a node may have several mapped lexical expressions, for example two words in different languages may refer to the same concept and thus map to the same node, or two or more words or expressions may be considered to relate to the same concept, for example the concept of an 'Urgent tone' of a document may be represented by the phrases 'ASAP', 'Urgent' and 'Immediately'.

The scanning component 225 first scans the input document 200 to identify instances of terms in the document, which may be words, phrases or arbitrary sequences of characters, that also appear in the lexicon or semantic network 200. The scanning component 225 records any such instances in the form of a list 240 of such terms, each term having an associated frequency value indicating the number of times it appears in the document. This scanning step does not take any account of the structure of the concept network, such as the relations between concepts. (In a modification, the list 240 of lexical expressions may be produced by other means and merely be provided to the disambiguation component.)

Each keyword or term in the document is also allocated a confidence value, given as a real number in the range [0 ... 1]. The confidence value represents the likelihood that the correct meaning of the term will be found. For example, common words for a language which may have many meanings will be given a lower confidence value than more unusual words. Again, this step does not take into account the structure of the concept network. Once the scanning component 225 has completed this process for every keyword in the document 200, the determiner component 230 determines a focus and the disambiguation component 245 carries out term disambiguation in accordance with the determined focus. Once some terms have been disambiguated the process of finding a focus may be repeated to find one or more other, different foci, which can be used to provide further term disambiguation.

Figure 5:
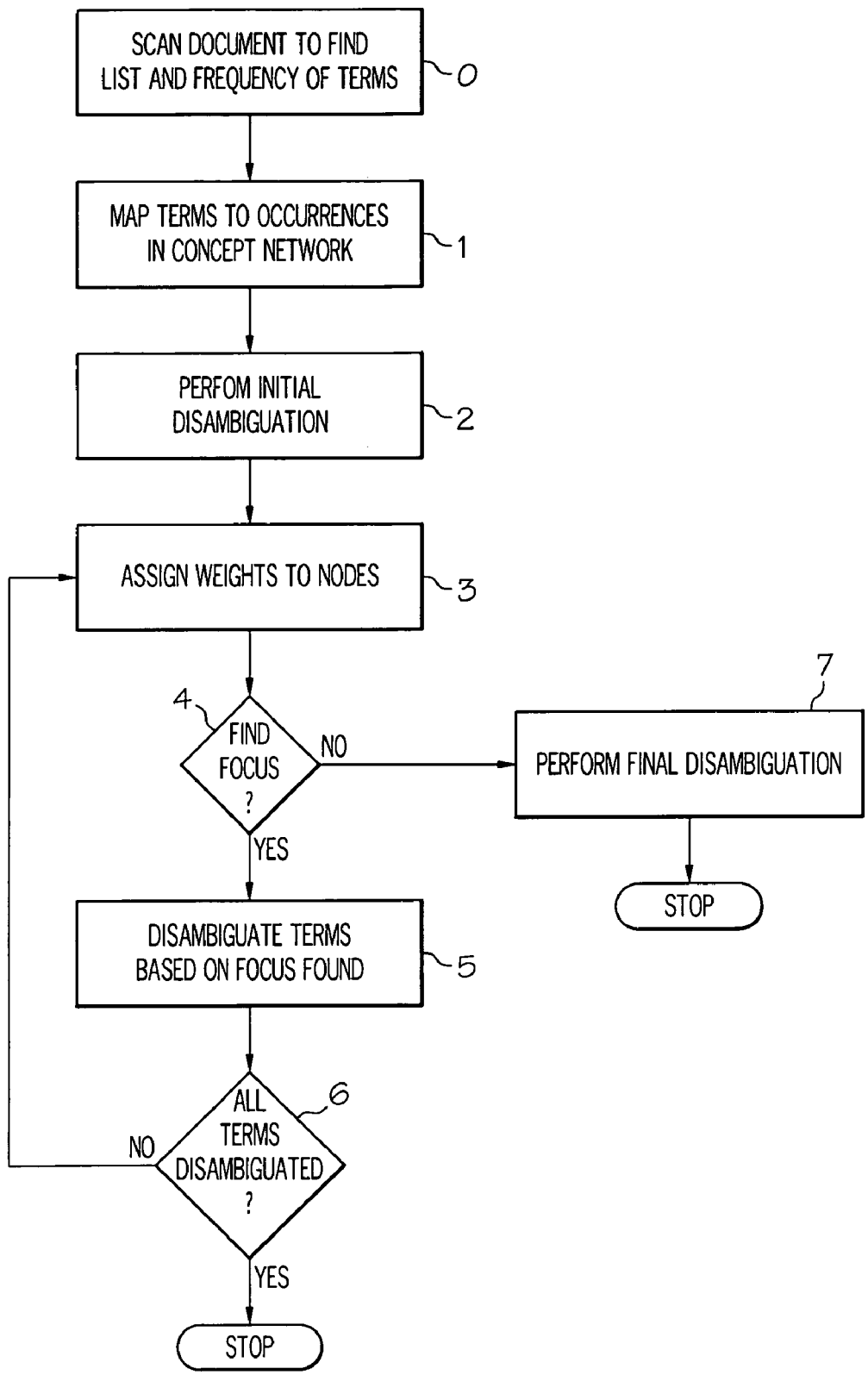
FIG. 5 shows a process in accordance with an embodiment of the method of the present invention.

The operational process of the focus determining component 210 can be formulized into an algorithm. An embodiment of such an algorithm will now be explained with reference to FIG. 5.

Step 0: Generate a list of terms appearing in the document and determine their frequency and confidence values.

Step 1: Find all possible referents (nodes) of lexical expressions (terms) from the document $R_j \sqsupset L_i$. In this step, a mapping from terms found in the document to occurrences of the term which appear in the concept network is made. Those lexical expressions which do not have any referents in the lexico-semantic network are omitted.

Step 2: Perform initial disambiguation, based on the "single sense per discourse" assumption. This is mechanism which is well known in the art, and was first suggested by Gale, W., K. Church, and D. Yarowsky, 'A Method for Disambiguating Word Senses in a Large Corpus," Computers and the Humanities, 26, pp 415-439, 1992. This uses the principle that an ambiguous term is likely to mean only one of its word senses when used multiple times within one page. A simplified example may help to explain the idea. Suppose a document refers to the person John Judge and later refers just to 'John', then the later reference to 'John' is assumed to refer also to the concept/person 'John Judge'. However, if the document mentions two people named John, 'John Judge' and 'John Stevens' say, then a reference to 'John' is still ambiguous.

Step 2 includes the following sub-steps: (2.1) Find all pairs of lexical expressions that refer to the same concept; (2.2) If a lexical expression is found in two or more such pairs referring to two or more different concepts, then disregard this lexical expression and the pairs to which it belongs; and (2.3) Disambiguate lexical expressions from remaining pairs (remove all referents, except common, for lexical expressions in each pair).

Step 3: Assign weights to nodes, starting with each of the possible referents. In this step weights are assigned to all nodes which are matched to terms from the document, whether the mapping is unambiguous (only one referent), or ambiguous mapping (one or more nodes per term or one or more terms per node).

For each lexical expression $L_i$ and for each referent of this lexical expression $R_j \sqsupset L_i$:

(3.1) Set the initial weight of referent $w_j$=frequency$_i$×confidence$_i$;

(3.2) Do a depth-first traversal of the graph, starting from the referent:

(3.2.1) Let the weight of the previous node in traversal be $w_{prev}$.

(3.2.2) Calculate a stepping factor (reduction multiplier) $m(t_{prev},t)$ for the current step from the previous node to the current node, where $t_{prev}$ is the type of the link used in the previous step (to get to the previous node) is, or is undefined if the previous node is the starting node of traversal, and t is the type of the link used in the current step.

(3.2.3) Set the weight of the current node in traversal to be $w_j = w_{prev} \times m(t_{prev},t)$.

(3.2.4) Follow the recursive step of the depth-first traversal of the graph while w>MaxWeight, where MaxWeight is the weight threshold. Repeat for all other referent nodes for that lexical expression. Repeat for the next lexical expression. Then, add together weights for each node from different traversals of the graph.

Step 4: Find a focus. Select a node with the highest weight $w_{max}$. If this node was selected as a focus in a previous iteration of the algorithm, select the next highest node. If the maximum weight is lower than a Maximum Focus Weight threshold, then a focus is deemed not to have been found. Flow then passes to on to Step 7.

Step 5: Disambiguate lexical expressions, based on the focus found in Step 4. For each lexical expression: Find all possible referents of this lexical expression with non-zero weight within a maximum number of steps from the focus node. A node (referent) with the highest value of importance$_j$−distance$_j$ is selected as a disambiguation of this lexical expression. All other referents of this lexical expression are removed from the network mapping.

Step 6: If all lexical expressions are disambiguated, stop. Else go to Step 3. This repeats the focus finding steps now that some terms have been disambiguated, which means that in Step 3 these terms will now only have a single 'correct' referent, rather than the plurality of possible referents each had previously.

Step 7: Perform final disambiguation. This step is performed if a focus is deemed not to have been found due to the maximum weight of any node being less than a focus weight threshold. If a lexical expression has higher than average confidence of recognition (0.5) and its most important referent has a higher than average importance (0.5), use it for disambiguation. This takes into account that you may end up with a few unconnected nodes/terms which are not related to any focus that has so far been found for the input document. The correct meaning of such terms is likely to be either their most important meaning, or the one which has the highest confidence value and so one of these is selected accordingly.

Depending on the application the algorithm's calculations can be changed in a number of ways for different effects, examples of which are presented below.

Modification 1.

The weights in Step 3.1 of the main algorithm may be divided between different referents of the same lexical expression, therefore changing formula to $$w_j = frequency_i \times confidence_i \times \frac{1}{count_i},$$

where $count_i$ is the number of remaining referents of the lexical expression $L_i$.

Modification 2.

The frequency in the Step 3.1 may be normalized, for example by the formula log(frequency+1). This would ensure that frequency values do not produce such a large influence on the initial weight of each node.

Modification 3.

The weights in Step 3.1 may use normalized importance (giving more weight to more important nodes), by changing the formula to $$w_j = frequency_i \times confidence_i \times \frac{importance_j}{\sum_{R_k \neg L_i} importance_k}.$$

If all importance values are equal (or if importance information is not available), this modification does not affect the algorithm.

Modification 4.

The weights in Step 3.2.5 may use normalized importance, therefore changing formula to $$w = w_{prev} \times m(t_{prev}, t) \times \frac{importance_j}{\sum_{k \in Out(prev)} importance_k},$$

where Out(prev) is a set of nodes linked by outgoing arcs from the previous node.

Modification 5.

Modification 5 may process links of different types separately, therefore changing the formula to $$w = w_{prev} \times m(t_{prev}, t) \times \frac{importance_j}{\sum_{k \in Out(prev, t_{prev})} importance_k},$$

where Out(prev,$t_{prev}$) is a set of nodes linked by outgoing arcs from the previous node using $t_{prev}$ link type.

Modifications 1 and 3 cannot be applied together. Modification 3 is normally applied in conjunction with modification 4. Modification 5 overwrites modification 4 and is also normally applied with modification 3.

The algorithm has been implemented and preliminary tests carried out using a geographical ontology and WordNet. A test of ability to disambiguate geographical terms using the geographical ontology provided by World Gazetteer was carried out. This testing showed similar performance in disambiguating geographical locations to that disclosed in the 'Web-a-Where' article mentioned earlier. The present invention has the advantage that it can be applied to generic graphs and is not restricted to hierarchically structured graphs. Further testing on WordNet, an unstructured semantic network, shows that the algorithm can disambiguate ambiguous concepts such as "mouse." The algorithm successfully disambiguates "mouse" to the meaning corresponding to the rodent when it is accompanied by mentions of "rat" and "squirrel" and to the computer peripheral device when it is accompanied by mentions of "keyboard" and "monitor." This shows that the algorithm can be used in a number of different scenarios using different data depending on the task: whole document processing to disambiguate terms and find document focus; and query processing disambiguation, query expansion (only activate synonym links)

Depending on the semantic resource used any ambiguous terms can be disambiguated. In all tests of the algorithm a high performance has been achieved, with the algorithm taking an average of approximately 200 ms per request.

In a further modification, "strength" may be assigned to links. As has been explained earlier the links between nodes in the concept network are typed, and this allows for certain types of links to be promoted or demoted in terms of importance. In applications like social network analysis, the addition of a link attribute defining the link's "strength" would allow for individual links to be considered "stronger" than others of the same type. For example two members of the same development team who are working on a specific project could be said to have a stronger link to each other than to the rest of their colleagues on their team. This modification allows a fine tuning of the algorithm based on properties of links, in a similar manner to the use of the 'importance' attribute of nodes.

Information associated with nodes, such as semantic information, can be used for a wide variety of tasks and in many different ways. In an application for disambiguating geographical terms the algorithm might choose to favour locations with a greater population. Semantic information can also be used to create dummy or virtual nodes which do not represent any particular concept but instead serve to provide a means for organizing other nodes into groups. These nodes don't represent any explicit concept and so don't appear as a result. The semantic information can also be in the form of a function which is performed for instance increasing the amount of weight propagated onwards depending on circumstances.

The complexity of the algorithm is linear, dependent upon the number of mentions in the text. The algorithm does not carry out pair-wise comparisons as in graph clustering algorithms which have quadratic complexity. The algorithm works fastest on semantic networks with low to medium node:link density ratios. A high density network will slow the process down. However, for networks where the number of links per node is less than or equal to log(n) where n is the number of nodes in the semantic network, the performance is optimal.

The method can be implemented efficiently and can run very quickly even on very large ontologies. This is because it does not need to deal with the entire graph to find a focus, instead it only deals with a (relatively) small portion of the graph and disregards the rest.

The scalability of the algorithm makes many new applications possible. The algorithm can work in real time on very large semantic networks, e.g., WordNet.

Unlike many known graph mining algorithms the speed of the algorithm's performance is not directly affected by the size of the ontology. Instead it depends on the portion of the graph that can be reached from a given start node and has a linear complexity based on the number of term mentions. As it is not necessary to visit each node in the graph, if new nodes are added there is no consequence in the overhead unless the new node(s) is added in the region concerned.

This method also allows per node tuning of how the focus is found by changing preferences on how certain semantic information associated with nodes affects the performance. Likewise, different types of links between nodes can be set to have different effects on onward and inward propagation to/from a node. This fine tuning capability means that various preferences and outcomes can be achieved, whilst avoiding side effects of changing the algorithm itself or its parameters.

Unlike many other ontological focus-finding algorithms, the method is not topology dependent and can be applied to any type of graph, not just those with a hierarchical structure.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a computer readable storage medium, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for finding a focus of a document using a semantic network comprising a plurality of nodes, each node representing a concept, and links, connecting the nodes, each link representing relations between the concepts, comprising:
providing a list of terms found in an input document which match concepts represented by the semantic network, as well as a frequency value for each matched term indicating a number of times the term appears in the input document;
mapping each matched term to a referent node or to a plurality of possible referent nodes in the semantic network;
assigning weights to nodes, comprising:
for each matched term:
i) selecting one of the referent nodes as a start node;
ii) assigning the start node an initial weight depending on the frequency value of the term;
iii) carrying out a depth-first traversal of the semantic network from the start node, at each node in the traversal calculating a weight of the current node based on the weight of the previous node in the traversal and a stepping factor, the search backtracking to the previous nodes when the weight of a current node is found to be less than a predefined weight threshold; and
iv) repeating i) to iii) for a next referent node for the term; and
repeating i) to iv) for the next matched term; and
adding together the weights for each node from all traversals; and
determining a focus of the input document based on the assigned weights of the nodes.

2. The method according to claim 1, further comprising:
calculating a stepping factor for a step in the traversal from the previous node to the current node.

3. The method according to claim 2, in which the stepping factor depends on the type of link between the current and previous node.

4. The method according to claim 3, in which, if the previous node is not a start node, the stepping factor also depends on the type of link between the previous node and the node prior to the previous node in the traversal.

5. The method according to claim 1, wherein determining a focus further comprises:
identifying the node having a heaviest weight.

6. The method according to claim 5, wherein determining a focus further comprises:
selecting as a focus the node having the heaviest weight.

7. The method according to claim 1, wherein the providing further comprises:
providing a confidence value for each matched term.

8. The method according to claim 7, wherein the initial weight assigned to a start node depends also on the confidence value associated with the matched term.

9. The method according to claim 7, further comprising:
scanning an input document to generate the list of terms and determining each term's frequency and confidence values.

10. The method according to claim 1, further comprising:
disambiguating matched terms having a plurality of possible referents, by selecting one of the possible referent nodes for a term based on the determined focus.

11. The method according to claim 10, wherein disambiguating a term further comprises:
selecting a referent node for a term according to the number of steps from the referent node to the focus node in the semantic network.

12. The method according to claim 11, in which nodes of the semantic network have associated importance values, and wherein the selection of a referent node for a term is also dependent on the importance of possible referent nodes.

13. The method according to claim 10, wherein disambiguating a term further comprises:
removing the mapping from the term to all possible referent nodes other than the selected referent node.

14. The method according to claim 1, further comprising:
repeating the assigning of weights and the finding of a focus until all terms are disambiguated or the maximum weight of any node is less than a focus weight threshold.

15. The method according to claim 14, in which the repeated finding of a focus further comprises, if the node with the heaviest weight has been selected as the focus in a previous iteration:
selecting as a focus the node with the next most heavy weight which has not previously been selected.

16. An apparatus for finding a focus of a document using a semantic network comprising a plurality of nodes, each node representing a concept, and links, connecting the nodes, each link representing relations between the concepts, comprising:
a central processing unit, a memory device and a storage device;
a list of terms found in an input document which match concepts represented by the semantic network, as well as a frequency value for each matched term indicating a number of times the term appears in the input document, and a mapping of each matched term to a referent node or to a plurality of possible referent nodes in the semantic network;
a determining component for assigning weights to nodes and determining a focus of the input document based on the assigned weights of the nodes, the assigning of weights comprising:
for each matched term:
  i) selecting one of the referent nodes as a start node;
  ii) assigning the start node an initial weight depending on the frequency value of the term;
  iii) carrying out a depth-first traversal of the semantic network from the start node, at each node in the traversal calculating a weight of the current node based on the weight of the previous node in the traversal and a stepping factor, the search backtracking to the previous nodes when the weight of a current node is found to be less than a predefined weight threshold; and
  iv) repeating i) to iii) for a next referent node for the term; and
repeating i) to iv) for the next matched term; and
adding together the weights for each node from all traversals.

17. The apparatus according to claim 16, further comprising:
a scanning component for generating the list of terms found in the input document which match concepts represented by the semantic network, as well as the frequency value for each matched term indicating the number of times the term appears in the input document, and for mapping each matched term to a referent node or to a plurality of possible referent nodes in the semantic network.

18. The apparatus according to claim 16, further comprising:
a disambiguation component for disambiguating matched terms having a plurality of possible referents based on the determined focus.

19. A computer program product stored into a computer readable storage medium, for finding a focus of a document using a semantic network comprising a plurality of nodes, each node representing a concept, and links, connecting the nodes, each link representing relations between the concepts, when executed on a computer, the computer readable storage medium comprising software code portions for:
providing a list of terms found in an input document which match concepts represented by the semantic network, as well as a frequency value for each matched term indicating a number of times the term appears in the input document;
mapping each matched term to a referent node or to a plurality of possible referent nodes in the semantic network;
assigning weights to nodes, comprising:
for each matched term:
  i) selecting one of the referent nodes as a start node;
  ii) assigning the start node an initial weight depending on the frequency value of the term;
  iii) carrying out a depth-first traversal of the semantic network from the start node, at each node in the traversal calculating a weight of the current node based on the weight of the previous node in the traversal and a stepping factor, the search backtracking to the previous nodes when the weight of a current node is found to be less than a predefined weight threshold; and
  iv) repeating i) to iii) for a next referent node for the term; and
repeating i) to iv) for the next matched term; and
adding together the weights for each node from all traversals; and
determining a focus of the input document based on the assigned weights of the nodes.

20. A data processing system for identifying the focus of a document using a semantic network comprising a plurality of nodes, each node representing a concept, and links, connecting the nodes, each link representing relations between the concepts, the data processing system comprising a central processing unit, a memory device and a storage device for:
providing a list of terms found in an input document which match concepts represented by the semantic network, as well as a frequency value for each matched term indicating a number of times the term appears in the input document;
mapping each matched term to a referent node or to a plurality of possible referent nodes in the semantic network;
assigning weights to nodes, comprising:
for each matched term:
  i) selecting one of the referent nodes as a start node;
  ii) assigning the start node an initial weight depending on the frequency value of the term;
  iii) carrying out a depth-first traversal of the semantic network from the start node, at each node in the traversal calculating a weight of the current node based on the weight of the previous node in the traversal and a stepping factor, the search backtracking to the previous nodes when the weight of a current node is found to be less than a predefined weight threshold; and
  iv) repeating i) to iii) for a next referent node for the term; and
repeating i) to iv) for the next matched term; and
adding together the weights for each node from all traversals; and
determining a focus of the input document based on the assigned weights of the nodes.

* * * * *